(12) United States Patent
Vella et al.

(10) Patent No.: US 7,068,423 B2
(45) Date of Patent: Jun. 27, 2006

(54) LOW COST FLEXIBLE AUTOMATED OPTICAL POWER MANAGEMENT

(75) Inventors: Paul Vella, Morgan Hill, CA (US); Dan Dan Yang, Ottawa (CA)

(73) Assignee: Dowslake Microsystems Corporation, Santa Clara, CA (US)

( * ) Notice: Subject to any disclaimer, the term of this patent is extended or adjusted under 35 U.S.C. 154(b) by 423 days.

(21) Appl. No.: 10/303,948

(22) Filed: Nov. 26, 2002

(65) Prior Publication Data

US 2004/0100685 A1 May 27, 2004

(51) Int. Cl.
*H01S 3/00* (2006.01)

(52) U.S. Cl. .................................. 359/341.42
(58) Field of Classification Search ........... 359/341.4, 359/341.41, 341.42, 337, 337.11; 398/37, 398/38, 94, 197
See application file for complete search history.

(56) References Cited

U.S. PATENT DOCUMENTS

| | | | | |
|---|---|---|---|---|
| 5,737,118 A | * | 4/1998 | Sugaya et al. | 359/341.43 |
| 5,822,112 A | * | 10/1998 | Itou et al. | 359/341.42 |
| 6,198,571 B1 | * | 3/2001 | Yang | 359/337 |
| 6,246,514 B1 | * | 6/2001 | Bonnedal et al. | 359/341.41 |
| 6,377,394 B1 | * | 4/2002 | Drake et al. | 359/341.41 |
| 6,498,677 B1 | * | 12/2002 | Sun et al. | 359/341.4 |
| 6,522,460 B1 | * | 2/2003 | Bonnedal et al. | 359/341.42 |
| 6,580,553 B1 | * | 6/2003 | Kim et al. | 359/341.41 |
| 6,631,027 B1 | * | 10/2003 | Lelic et al. | 359/341.41 |
| 6,678,088 B1 | * | 1/2004 | Stummer et al. | 359/341.41 |
| 6,687,045 B1 | * | 2/2004 | Lelic | 359/337.1 |
| 6,690,506 B1 | * | 2/2004 | Zahnley et al. | 359/337.11 |
| 6,697,190 B1 | * | 2/2004 | Yang | 359/341.4 |
| 6,747,791 B1 | * | 6/2004 | Yang et al. | 359/337.1 |
| 2003/0214702 A1 | * | 11/2003 | Yang | 359/341.4 |
| 2003/0231379 A1 | * | 12/2003 | Komaki et al. | 359/337.4 |
| 2004/0100688 A1 | * | 5/2004 | Iizuka et al. | 359/341.41 |

* cited by examiner

*Primary Examiner*—Jack Keith
*Assistant Examiner*—Deandra M. Hughes
(74) *Attorney, Agent, or Firm*—Cassan Maclean

(57) ABSTRACT

Circuits and systems for use in monitoring and adjusting an optical signal strength of an optical data transmission system. A closed feedback loop which automatically controls an optical device's output uses an analog operational amplifier based circuit instead of a conventional microprocessor that uses complex calculations. The parameters of the operational amplifier circuit are monitored and controlled by a microcontroller to provide flexible operational settings. The analog circuit containing discrete analog components is used as a power meter for measuring an optical power signal strength of an optical signal. The optical signal is tapped by an optical coupler and the signal is received by a photodetector. The output of the photodetector is received by the analog circuit which produces an intermediate signal based on the level of optical power in the optical signal. The intermediate signal is used to control an optical device. Since the operating parameters of some of the analog components in the analog circuit may be controlled by the microcontroller, the analog circuit may therefore be calibrated or adjusted by the microcontroller. This allows one to take advantage of the speed of analog component based circuits while keeping the flexibility and communications capability of a digital circuit such as a microcontroller.

18 Claims, 4 Drawing Sheets

LOW COST FLEXIBLE AUTOMATED OPTICAL POWER MANAGEMENT

FIELD OF THE INVENTION

The present invention relates to systems for managing optical power in an optical data transmission system. More specifically, the present invention is particularly applicable for controlling a constant gain optical power management system.

BACKGROUND TO THE INVENTION

Optical communications is fast becoming the telecommunications industry's standard in terms of reliability and transmission capacity. To this end, optical communications equipment are continually being improved and updated to provide faster, cheaper, and more feature laden alternatives. To provide acceptable performance in optical communications networks, optical amplifiers and optical attenuators amplify or attenuate the optical signal as needed. However, while these amplifiers and attenuators generally provide the required change in optical power to the optical signal, it is standard practice in industry to use automatic output control devices to monitor the optical signal.

Such automatic output control devices, and the systems used in such devices, use a feedback loop to monitor the optical signal strength. If the optical signal strength falls below a certain threshold, a pump laser is activated and enough optical power is inserted into the optical signal to boost its optical power sufficiently to meet predetermined standards. These systems normally use expensive high sped microcontrollers and high speed components to provide fast response times. This approach is seen in the optical amplifier system as disclosed by Yang in U.S. Pat. No. 6,198,571.

In such an approach, a high speed microcontroller is required to perform the multiple calculations and decisions required to provide fast response times. Unfortunately, such an approach is not only complicated but is also quite expensive. The use of A/D (analog-digital) converters which convert the analog optical signal into a digital signal which can be read and used by the microcontroller introduces delays into the response times of the system. Also, such high speed microcontrollers can be quite expensive. Furthermore, the complexity of the software required for these microcontrollers increases the price for the system.

High speed microcontrollers are usually required as Erbium doped fiber amplifiers (EDFAs) may exhibit a transient problem when channels at the amplifier input suddenly increase in either power or number. The gain control for the EFDA must be very fast in order to compensate for the sudden change in input. The digital microcontroller must react within microseconds to be able to provide a stable gain to the other channels in the optical signal. The microcontroller must therefore execute a few iterations to not only detect but compensate for the sudden change. If the reaction time is not fast enough, large overshoots (overcompensation) or undershoots (under-compensation) will occur at the output of the amplifier.

To compensate for such problems, two major approaches are generally followed, both of which use digital circuits. The first is generally known as a feed forward compensation or a digital open loop. In this approach, a step in the gain control circuit is applied in response to a step change in the input power. Essentially, this approach measures the change in input and then calculates the amount by which the gain or output should be adjusted. The pump laser is then adjusted and the output is checked. If the desired level is not achieved, the steps in the loop are repeated. Such an approach, aside from being expensive due to the need for a high speed microcontroller, suffers from the problem of extraneous factors which may affect the performance of the system. Age, temperature effects, noise, and many other factors can degrade the performance of the digital open loop system.

A second approach, called a digital closed loop, compares the desired signal gain with the effective gain during the signal transient. Any difference or error between the two is used in a feedback loop to adjust the setting on the pump laser.

While digital control loops can be fast in terms of response times, they generally require expensive and complex digital components such as dedicated DSPs (digital signal processors) and high speed A/D and D/A converters.

Based on the above, a new approach is therefore needed that will not only provide the required fast response time but will simultaneously provide a solution that is inexpensive. Ideally, such a solution should also provide the flexibility of digital circuits while also providing the required fast response times. It is therefore an object of the present invention to provide alternatives which overcome or at least mitigate the drawbacks of the prior art.

SUMMARY OF THE INVENTION

The present invention provides circuits and systems for use in monitoring and adjusting an optical signal strength of an optical data transmission system. A closed feedback loop which automatically controls an optical device's output uses an analog operational amplifier based circuit instead of a conventional microprocessor that uses complex calculations. The parameters of the operational amplifier circuit are monitored and controlled by a microcontroller to provide flexible operational settings. The analog circuit containing discrete analog components is used as a power meter for measuring an optical power signal strength of an optical signal. The optical signal is tapped by an optical coupler and the signal is received by a photodetector. The output of the photodetector is received by the analog circuit which produces an intermediate signal based on the level of optical power in the optical signal. The intermediate signal is used to control an optical device. Since the operating parameters of some of the analog components in the analog circuit may be controlled by the microcontroller, the analog circuit may therefore be calibrated or adjusted by the microcontroller. This allows one to take advantage of the speed of analog component based circuits while keeping the flexibility and communications capability of a digital circuit such as a microcontroller.

In a first aspect, the present invention provides a system for managing optical power in an optical data transmission system, the system comprising:

- at least one analog feedback circuit for receiving an input from an optical means;
- an optical device for controlling optical power characteristics of an optical signal in said optical data transmission system;
- digital circuit means for controlling operational parameters of said at least one analog feedback circuit; and
- an analog control circuit for controlling said optical device based on at least one intermediate signal from said at least one analog feedback circuit, wherein
an output of said optical device is controlled by said analog feedback circuit, said optical means is an optical means for directly receiving an optical input from an optical coupler coupled to said optical data transmission system.

In a second aspect, the present invention provides a method of managing optical power in an optical data transmission system, the method comprising:

a) diverting an input portion of an input optical signal of said system;

b) diverting an output portion of an output optical signal of said system;

c) amplifying said input portion by a first predetermined amount to arrive at a first intermediate signal;

d) amplifying said input portion by a second predetermined amount to arrive at a second intermediate signal;

e) taking a difference between said first intermediate signal and said second intermediate signal;

f) using said difference to control an optical device to compensate for said difference, wherein said first and second predetermined amounts are set by a microcontroller and steps c) and d) are performed by separate analog circuits.

BRIEF DESCRIPTION OF THE DRAWINGS

A better understanding of the invention will be obtained by considering the detailed description below, with reference to the following drawings in which.

DETAILED DESCRIPTION

Figure 1:
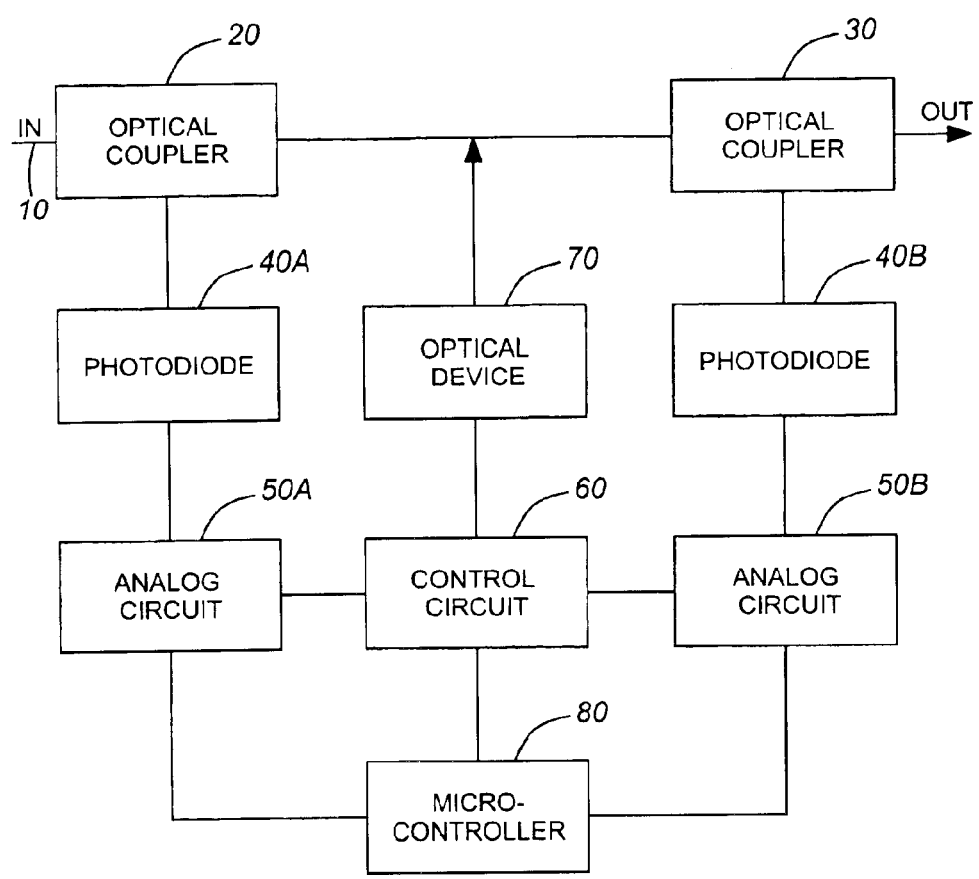
FIG. 1 is a block diagram of an optical power management system according to one aspect of the invention.

Referring to FIG. 1, a feedback control mechanism for an optical data transmission system is illustrated. An optical fiber 10 carries an optical signal. Optical couplers 20, 30 each tap into the fiber 10 to divert a portion of the optical signal for the feedback mechanism. The portion of the optical signal is received by a photodiode 40A, 40B. The output of the photodiode is then received by an analog circuit 50A, 50B. Also illustrated in FIG. 1 is a microcontroller 80 which controls the operating parameters of the analog circuits 50A, 50B. The microcontroller 80 is not programmed to assess the optical signal strength as in the digital control loops mentioned above. Instead, the microcontroller 80 merely adjusts the parameters of some of the components in the analog circuits 50A, 50B and, possibly, a mode of the control circuit 60. Because the microcontroller 80 merely adjusts or perhaps calibrates the analog circuits 50A, 50B, a high speed microcontroller is not required. Instead, a low cost microcontroller will suffice.

In terms of function, the analog circuits 50A, 50B receive the output of the photodiodes 40A, 40B. Each of the analog circuits 50A, 50B then processes their respective input signals from their corresponding photodiodes 40A, 40B to arrive at an intermediate signal. These intermediate signals relate to the optical power levels received by the photodiodes 40A, 40B and are, in one embodiment, produced by amplifying these received power levels. The intermediate signals produced by the analog circuits 50A, 50B are then received by the control circuit 60. Based on these intermediate signals, the control circuit 60 controls the output of the optical device 70. The optical device 70 may be a device that controls the optical gain or power for the optical signal travelling through the optical fiber 10. As such, the optical device 70 may be a pump laser for controlling the amplification of the optical signal, an optical attenuator for controllably attenuating the optical signal, or any other optical device capable of variably affecting the gain, power, or signal strength of an optical signal.

For clarity, it should be noted that photodiodes 40A, 40B receive input and output optical power respectively. Photodiode 40A receives optical power from the input optical signal before any adjustments are made (if any) to this optical signal by the optical device 70. Photodiode 40B receives optical power from an output signal that results after adjustments (if any) are made to the input optical signal by the optical device 70.

As noted above, the control circuit 60 controls the optical device 70 based on the intermediate signals produced by the analog modules 50A, 50B. Several modes of operation are possible for the control circuit 60, each mode being for a different operating profile. As previously mentioned, the microcontroller 80 can control the mode of the control circuit 60. One specific mode of operation is designed to maintain a constant gain between the input and the output power levels detected by the photodiodes 40A, 40B. In this mode, a desired ratio between the intermediate signals from analog circuits 50A, 50B is set and any difference between the intermediate signals is amplified. Once amplified, any difference is used to correct for such anomalies as they occur.

Figure 3:
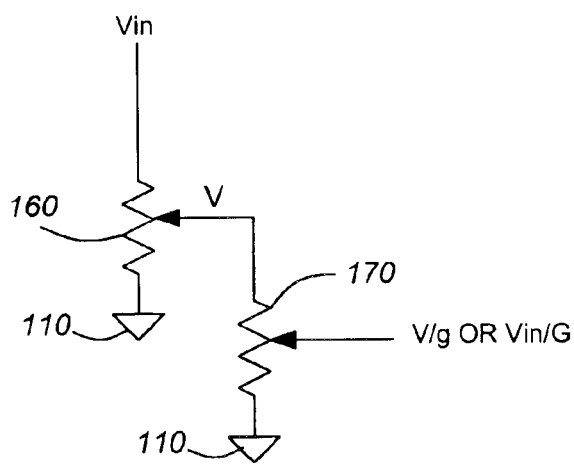
FIG. 3 is a circuit diagram of a subcircuit which may be used as replacement for a section of the subcircuit of FIG. 2.

Regarding the analog circuits 50A, 50B, FIG. 3 illustrates a block diagram of one possible configuration for its internal components. As can be seen, the photodiode 70 is included in the circuit as being coupled between ground 110 and a resistor 120 (with resistor value Rf). Also coupled to junction 130 along with the photodiode 70 and one end of resistor 120 is one input to an operational amplifier 130. Another input to the operational amplifier 130 is coupled at junction 140 to one end of a digital potentiometer 150. The other end of potentiometer 150 is coupled to ground 110 while the setting of the potentiometer 150 is coupled to the other end of resistor 120.

Figure 2:
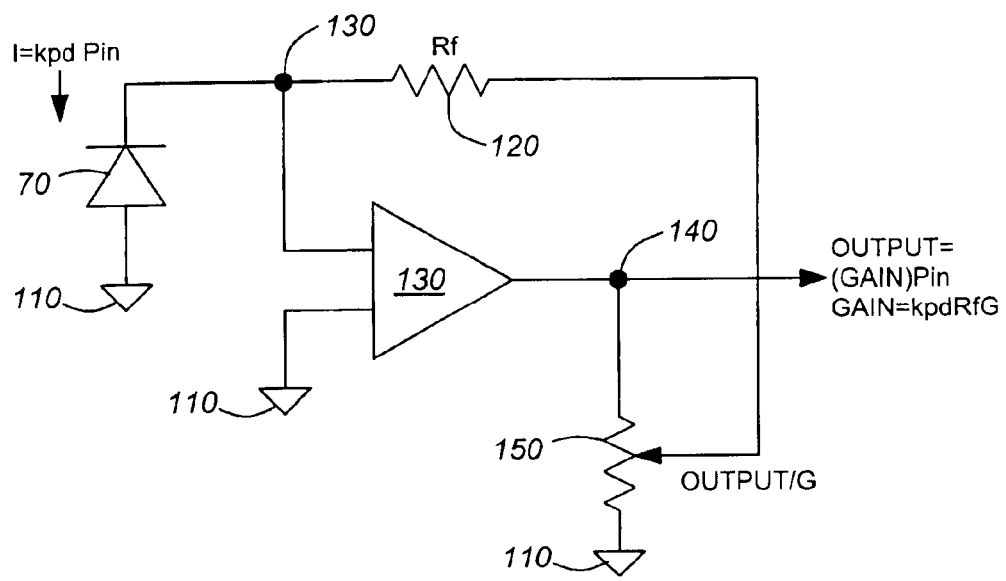
FIG. 2 is a circuit diagram of a combined analog power detector/amplifier subcircuit which may be used in an analog circuit in FIG. 1.

The circuit in FIG. 2 is linear yet has a controllable gain that does not sacrifice bandwidth in the same manner as a logarithmic amplifier does. For low level inputs, the digital potentiometer 150 (or a DAC) is set low. This setting keeps the output from being in the millivolt range. Only the operational amplifier 130 requires a very low offset voltage and not the whole feedback mechanism/system as a whole. As can be seen from the Figure, the input current is $I = k_{pd} P_{in}$ while the output is given as $Output = (Gain) P_{in}$ where $Gain = k_{pd} R_f G$.

In the configuration of FIG. 2, optical power is detected and then amplified by an amount controlled by the setting of the digital potentiometer or DAC 150. This configuration allows the implementation of constant gain mode without the use of logarithmic amplifiers or analog divider circuits that are inconsistent in accuracy and speed. Furthermore, having a controllable gain setting in the first stage of the overall system minimizes errors of later circuits. It should be clear that the setting for the digital potentiometer 150 may be controlled by the microcontroller 80.

As a refinement to the circuit in FIG. 2, FIG. 3 illustrates a dual digital potentiometer configuration which may be used in place of the potentiometer 150 in the circuit of FIG. 2. As can be seen in FIG. 3, the two potentiometers 160, 170 are cascaded. Both potentiometers are coupled to ground 110 and the output of potentiometer 170 controls the setting of the potentiometers 160. The setting of potentiometer 170 is coupled to the other end of the resistor 120.

Figure 4:
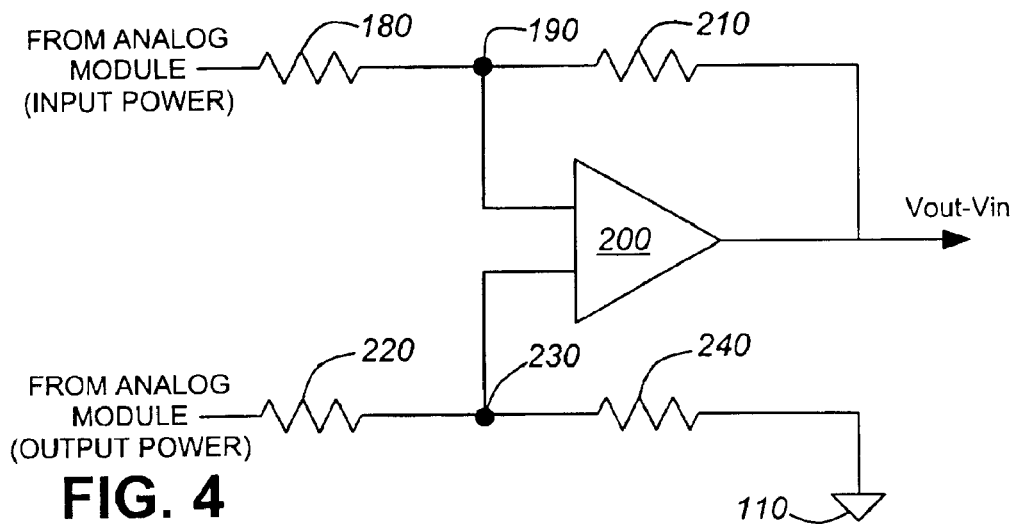
FIG. 4 is a circuit diagram of a subcircuit which may be used in the control circuit as illustrated in FIG. 1.

While the circuits in FIGS. 2 and 3 may be used for the analog circuits 50A, 50B, it is noted above that one of the possible modes of control circuit 60 provides constant gain. As such, FIG. 4 illustrates a circuit which may be used for the control circuit 60. In this circuit, a difference between the intermediate signals from the analog circuits 50A, 50B is taken and amplified. By judiciously selecting the gain settings for each of analog circuits 50A, 50B, the intermediate signals they produce could be made equal to one another. As mentioned above, constant gain requires a fixed ratio between input and output power of the optical system. If this fixed ratio is set and the gain settings for analog circuits 50A, 50B are set so that their intermediate signals signify a deviation from the desired fixed ratio, such a difference can then be used to compensate for the deviation that it signifies.

As can be seen from FIG. 4, the input from the analog circuit 50A is received through resistor 180 which is coupled to junction 190. Also coupled to junction 190 is one input to operational amplifier 200 and one end of resistor 210. The other end of resistor 210 is coupled to the output of the operational amplifier 200. The input from the analog circuit 50B is received through resistor 220 which is coupled to junction 230. Also coupled to junction 230 is the other input to operational amplifier 200 along with one end of resistor 240. The other end of resistor 240 is coupled to ground 110.

The constant gain control scheme explained above has the advantage of not requiring analog divider circuits. Such divider circuits are, as noted above, inconsistent in terms of accuracy and speed. Division is not required by the above scheme. All that is required is taking the difference between the voltages (intermediate signals) from the analog circuits 50a, 50B.

However, the above scheme does have a drawback. As signal levels drop (as optical signal levels get reduced), the loop bandwidth will also diminish. This is undesirable in that there is an optimum bandwidth for system performance and this optimum bandwidth should not significantly vary with signal level. To compensate for this drawback, an extra amplifier subcircuit may be coupled to the output of the operational amplifier 200 of FIG. 4.

Figure 5:
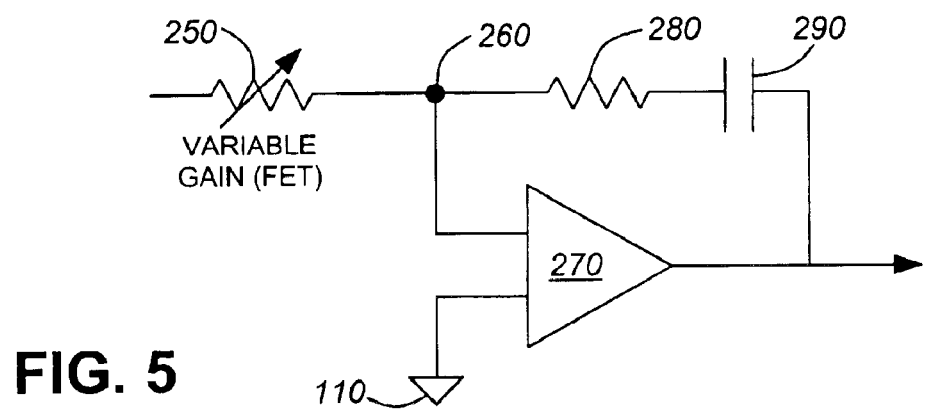
FIG. 5 is a circuit diagram of a second amplifier subcircuit which may be used in the control circuit in FIG. 1.

Referring to FIG. 5, a circuit diagram of a second amplifier circuit which may be used with the circuit of FIG. 4 is illustrated. This second amplifier subcircuit may be located in the control circuit module 60 along with the circuit illustrated in FIG. 4. Input from the circuit of FIG. 4 is received at one end of a variable gain resistor 250. The other end of resistor 250 is coupled to junction 260. Also coupled to junction 260 is one input to operational amplifier 270 while the other input of operational amplifier 270 is coupled to ground 110. Also coupled to junction 260 is, in series, resistor 280 and capacitor 290. The output of the operational amplifier 270 is coupled to the other end of capacitor 290. The variable gain resistor 250 may be implemented using a field effect transistor (FET) channel. The setting of the resistor 250 is adjusted to keep the bandwidth approximately constant.

Figure 6:
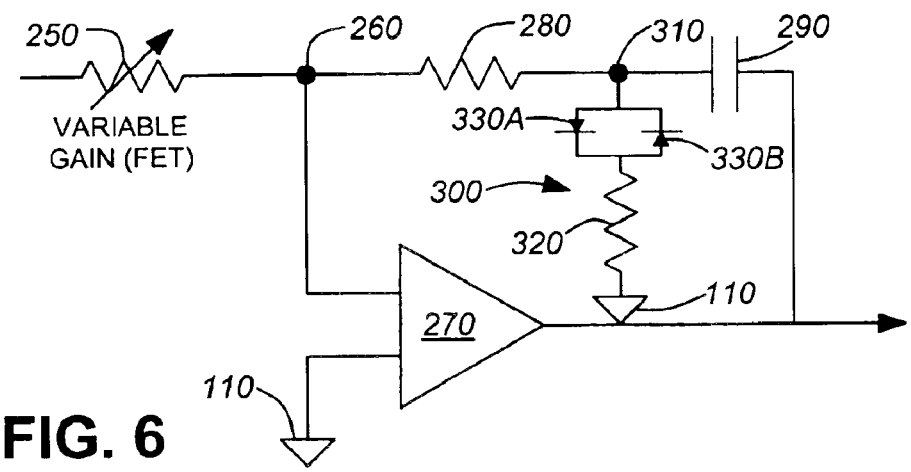
FIG. 6 is a circuit diagram of a modified version of the second amplifier subcircuit of FIG. 5.

Referring to FIG. 6, a refinement of the circuit in FIG. 5 is illustrated. The circuit in FIG. 6 is similar to that in FIG. 5 except for a circuit arm 300 coupled to a junction 310 between resistor 280 and capacitor 290. The circuit arm 300 has resistor 320 coupled to ground 110 at one end and, at the other end, to a pair of diodes 330A, 330B coupled in parallel to one another. The diodes 330A, 330B are coupled in parallel with one diode 330A allowing the current to pass in one direction while the other diode 330B allows current to pass in the other direction. As noted above, the parallel diode arrangement is coupled at one end to resistor 320 and coupled to junction 310 at the other end.

For the circuit in FIG. 6, the RC time constant is reduced, and hence the bandwidth is increased at high error output levels. At such levels, the diodes 330A, 330B turn on and shunt resistor 320 in the path. As such, the circuit allows the feedback system to respond quickly when significant errors are present but also allows the system to have a lower bandwidth and, consequently, lower noise when errors are small.

Figure 7:
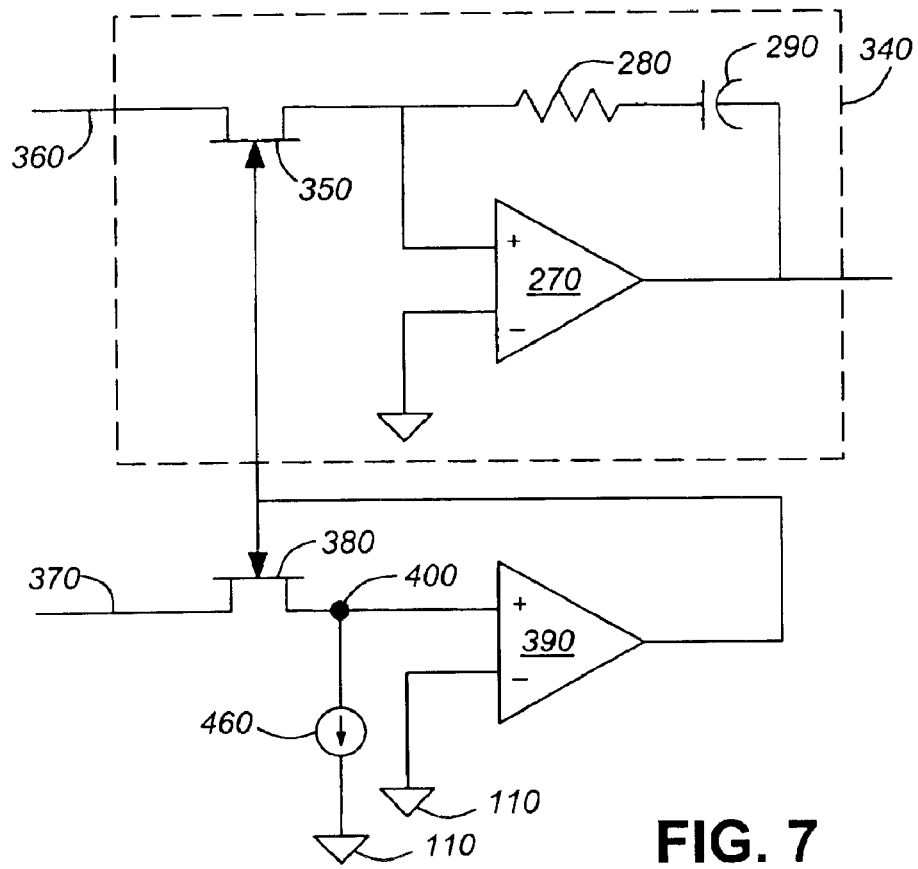
FIG. 7 is a circuit diagram of a subsystem that uses the output of the circuit of FIG. 4 to provide constant gain.

As a further refinement to the circuits of FIGS. 5 and 6, FIG. 7 illustrates an arrangement that achieves an approximately constant gain using an output of the operational amplifier 200 from FIG. 4. As can be seen, although box 340 is virtually a copy of the circuit in FIG. 5, the circuit in FIG. 6 can be inserted in the same spot. The main difference between the circuit in FIG. 5 and the circuit in box 340 is that the circuit in box 340 uses a field effect transistor (FET) 350 to implement the variable resistor 250 of FIG. 5. The first input signal 360 in FIG. 7 is from the operational amplifier 200 of FIG. 4 while the second input signal 370 is the intermediate signal from the analog circuit 50A which detects the optical input power to the system. The gates of FETs 350, 380 are both coupled to the output of operational amplifier 390 and, for both FETs 350, 380, one lead is coupled to an input while the other is coupled to an input of an operational amplifier. For FET 350, one lead is coupled to junction 260 (see FIG. 5). For FET 380, one lead is coupled to the second input signal 370 while the other lead is coupled to junction 390. Junction 390 is also coupled to a current source 400 which is, in turn, coupled to ground 110. Junction 400 is also coupled to one input of operational amplifier 390. The other input of operational amplifier 390 is coupled to ground 110. As noted above, the output of operational amplifier 390 is coupled to the gates of FETs 350, 380

It should be noted that the circuit in FIG. 7 has a few interesting characteristics. The voltage of the intermediate signal from analog circuit 50A is proportional to the input optical power of the system. Also, the resistances represented by the FETs 350, 380 are each proportional to the input power as well. The method represented by the circuit in FIG. 7 is that two matched FETs are used (in this case FETs 350, 380). Thus, one FET in a feed-back loop using the output of analog circuit 50A results in the correct gate control voltage and compensates for any input power fluctuations.

Figure 8:
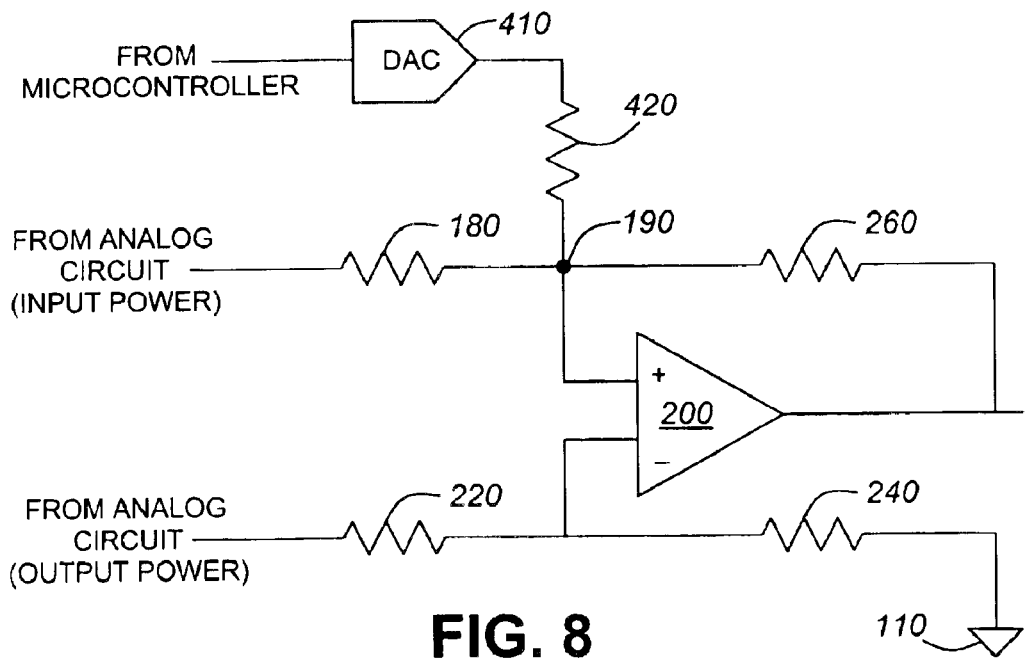
FIG. 8 is a circuit diagram of a configuration of the circuit of FIG. 4 with a controllable offset for ASE compensation.

It should be further noted that the design discussed above allows for easy ASE (amplified spontaneous emission) compensation. An offset to the operational amplifier 200 of FIG. 4 can be provided to compensate for ASE. This is illustrated in FIG. 8. As can be seen in FIG. 8, the circuit is the same as in FIG. 4 except for the addition of a DAC 410. The DAC 410 (Digital-Analog Converter) receives digital input from the microcontroller 80 and converts this into an analog signal. The output of the DAC 410 is coupled to junction 190 by way of resistor 420. This DAC 410 output serves as an offset for the operational amplifier 200 and need only be changed when the gain settings for the system is changed. Clearly, changing the DAC setting is effected by changing the digital value of the digital input from the microcontroller 80. Such an offset compensation is simple yet accurate due to the linear amplifier scheme employed.

While the analog circuit illustrated in FIG. 1 does not include the photodiode 40A, other optical means for receiving the optical signal from the coupler may be used and may be included in the analog circuit.

It should be noted that, while the microcontroller may not have a direct role in the power management role of the system, it can play a useful role. The microcontroller provides an interface by which the power management system acquires flexibility. Parameters in the system, such as the operating mode of the control circuit (e.g. constant gain, constant power), operational values of both the control circuit and of the analog circuits (e.g. gain, power), ASE compensation offset value, correction for optical or analog errors, may all be implemented by way of the microcontroller. As such, the microcontroller can be programmed to change values, settings, and other parameters in response to changing conditions or desired results. Clearly, other digital circuit means than a microcontroller may be used. A direct connection to a personal computer, programmable digital combinational circuits, and other digital circuit means may be used.

It should further be noted that the combination of the analog components in the analog circuits 50A, 50B and in the control module 60 with the digital circuit means, as embodied in the microcontroller, provides advantages unique to each one. The analog circuits provide very fast response times to changing conditions while the microcontroller provides an added dimension of flexibility and communication between the user and the power management system. The digital circuit means therefore provide the programmability and controllability of the system while the analog components provide the fast response times.

The above system may be used in any optical power management system as a means of controlling the optical power in an optical data transmission system. As such, optical amplifier systems, variable optical attenuator systems, and other systems which affect the optical power of a data transmission system are eminently suited to use the above system. It has been found that a variable optical attenuator using the above system has fast response times and flexibility while keeping overall costs down.

A person understanding this invention may now conceive of alternative structures and embodiments or variations of the above all of which are intended to fall within the scope of the invention as defined in the claims that follow.

We claim:

1. A system for managing optical power in an optical data transmission system, the system comprising:
at least one analog feedback circuit for receiving an input from an optical means;
an optical device for controlling optical power characteristics of an optical signal in said optical data transmission system;
digital circuit means for controlling operational parameters of said at least one analog feedback circuit; and
an analog control circuit for controlling said optical device based on at least one intermediate signal from said at least one analog feedback circuit,
wherein
an output of said optical device is controlled by said analog feedback circuit, said optical means is an optical means for directly receiving an optical input from an optical coupler coupled to said optical data transmission system:
and wherein the or each analog feedback circuit comprises amplifier circuit means for amplifying said input from said optical means to result in said intermediate signal, operational parameters of said amplifier circuit means being controlled by said digital circuit means.

2. A system according to claim 1 wherein said analog control circuit receives intermediate signals from two analog feedback circuits.

3. A system according to claim 2 wherein said analog control circuit takes a difference between said intermediate signals from said two analog feedback circuits.

4. A system according to claim 3 wherein an amount of said difference is used to control said optical device.

5. A system according to claim 4 wherein said difference is used to provide constant gain in said optical data transmission system.

6. A system according to claim 1 wherein said optical device is a pump laser.

7. A system according to claim 1 wherein said optical device is an optical attenuator.

8. A system according to claim 2 wherein each of said two analog feedback circuits receive input from optical means receiving optical input from differently located optical couplers.

9. A system according to claim 8 wherein said differently located optical couplers are located such that said optical device is between said optical couplers.

10. A system according to claim 1 wherein said digital circuit means controls a variable amount by which said circuit means amplifies said input from said optical means.

11. A system according to claim 1 wherein said analog control circuit includes an amplifier subcircuit for providing an adjustable bandwidth.

12. A system according to claim 1 wherein the or each of said at least one analog feedback circuit is a linear analog circuit having an amplification parameter controlled by said digital circuit means.

13. A system according to claim 1 wherein said digital circuit means is a microcontroller.

14. A system according to claim 1 wherein the or each of said analog feedback circuit is based on an operational amplifier.

15. A method of managing optical power in an optical data transmission system, the method comprising:
diverting an input portion of an input optical signal of said system;
diverting an output portion of an output optical signal of said system;
amplifying said input portion by a first predetermined amount to arrive at a first intermediate signal;
amplifying said input portion by a second predetermined amount to arrive at a second intermediate signal;
taking a difference between said first intermediate signal and said second intermediate signal;

using said difference to control an optical device to compensate for said difference, wherein said first and second predetermined amounts are set by a microcontroller and said step of amplifying said input portion by the first predetermined amount and said step of amplifying said input portion by the second predetermined amount are performed by separate analog circuits.

16. A method according to claim 15 wherein said step of amplifying said input portion by the second predetermined amount and said step of taking a difference are performed by an analog control circuit.

17. A method according to claim 15 further including the step of providing a voltage offset to said analog control circuit.

18. A method according to claim 17 wherein said voltage is provided by a digital signal from said microcontroller.

* * * * *